United States Patent [19]

Sheffler

[11] Patent Number: 5,465,856

[45] Date of Patent: Nov. 14, 1995

[54] PLASTIC CONTAINER HAVING INJECTION-MOLDED CONTAINER COMPONENTS

[75] Inventor: Robert J. Sheffler, Morganville, N.J.

[73] Assignee: Brent River Packaging Corporation, Flemington, N.J.

[21] Appl. No.: 84,926

[22] Filed: Jul. 1, 1993

[51] Int. Cl.⁶ .................. B65D 8/04; B65D 8/22
[52] U.S. Cl. .......... 215/370; 220/4.06; 220/613; 220/679; 220/680
[58] Field of Search ............ 229/4.5, 5.5; 215/1 C; 220/4.01, 4.05, 4.06, 613, 677, 678, 679, 680

[56] References Cited

U.S. PATENT DOCUMENTS

| | | | |
|---|---|---|---|
| 3,244,312 | 4/1966 | Lawson | 220/5 |
| 3,302,813 | 2/1967 | Schaich | 220/678 |
| 3,341,048 | 9/1967 | Carbone | 215/1 C |
| 3,342,365 | 9/1967 | Lux et al. | 215/1 C |
| 3,799,821 | 3/1974 | Jones | 229/4.5 |
| 3,885,701 | 5/1975 | Becklin | 220/325 |
| 3,887,316 | 6/1975 | Hestehave | 425/242 B |
| 3,938,687 | 2/1976 | Maier et al. | 220/5 R |
| 4,251,001 | 2/1981 | Hipp, Jr. | 215/237 |
| 4,252,585 | 2/1981 | Raabe et al. | 229/5.5 |
| 4,356,926 | 11/1982 | Priestly et al. | 220/67 |
| 4,372,459 | 2/1983 | Newman | 220/76 |
| 4,572,851 | 2/1986 | Fortuna | 428/35 |
| 4,579,242 | 4/1986 | Ellis, III | 215/1 C |
| 4,610,394 | 9/1986 | Bryson | 239/57 |
| 4,762,249 | 8/1988 | Fortuna et al. | 229/5.5 |
| 4,931,329 | 6/1990 | Sun | 428/36.92 |

FOREIGN PATENT DOCUMENTS 2445458   7/1980   France ........................ 220/677

OTHER PUBLICATIONS

"Joining the Engineering Plastics" by Edward M. Petrie from Adhesives Age, (Aug. 1980), pp. 14–21, 23.

"The Wiley Encyclopedia at Packaging Technology", John Wiley & sons, (1986), pp. 700, 701.

Primary Examiner—Gary E. Elkins
Attorney, Agent, or Firm—H., Gibner Lehmann; K. Gibner Lehmann

[57] ABSTRACT

A container constituted of injection-molded plastic components, the components having the property of enabling discrete particles thereof to be securely joined to each other under the action of heat and pressure. The injection-molded components form a pair of continuous mating edges adapted to constitute a common continuous joint in the container. The edges initially have configurations enabling them to be mutually abutted, and the edges after being so abutted having been subjected to heat and pressure of a magnitude sufficient to cause them to meet and merge into each other to form the continuous joint.

16 Claims, 3 Drawing Sheets

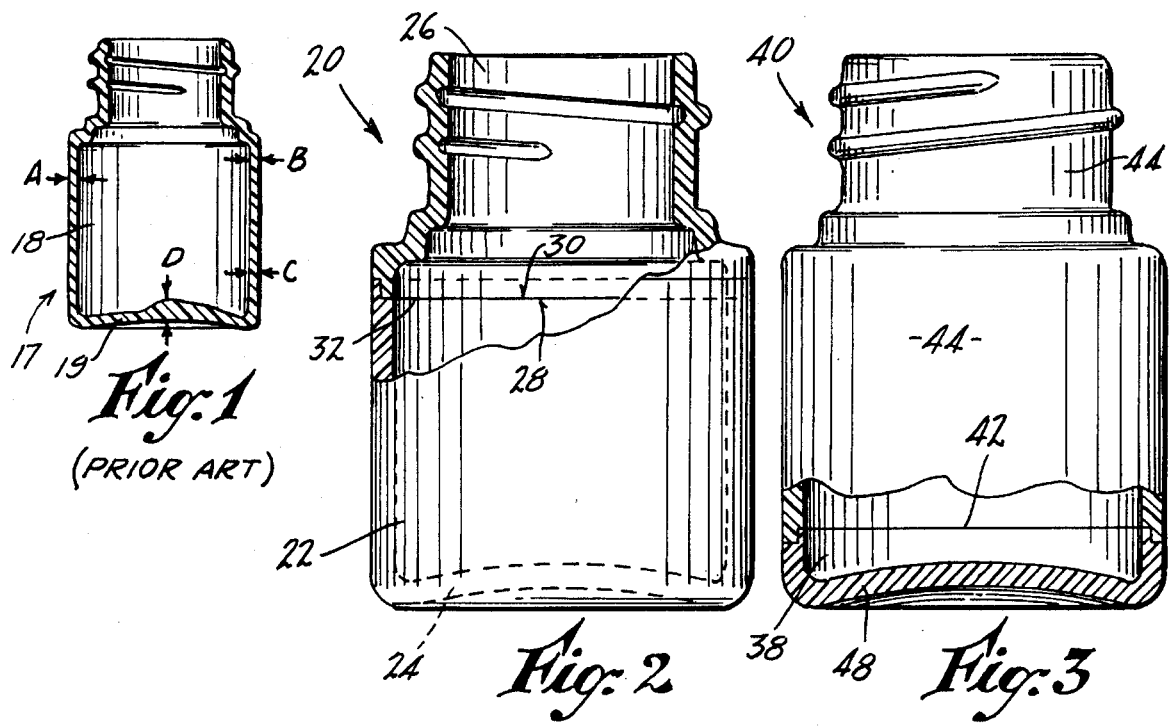
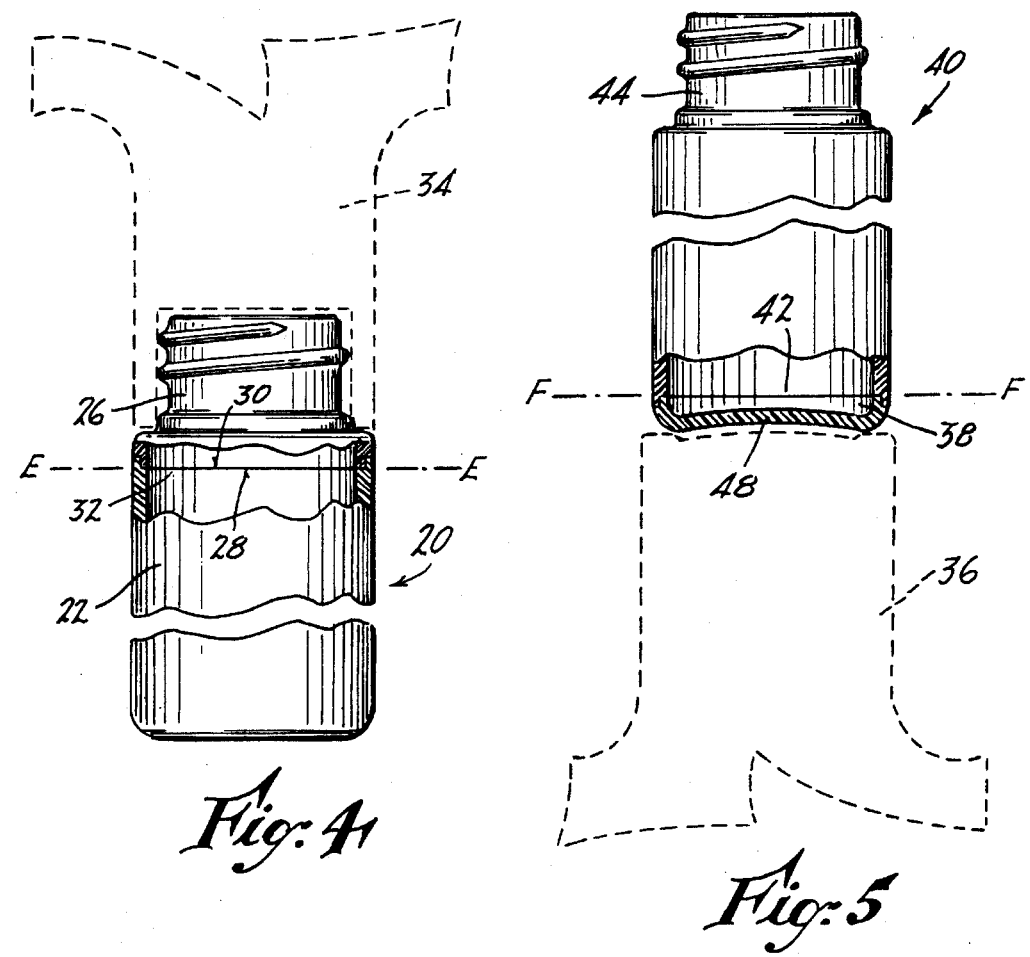

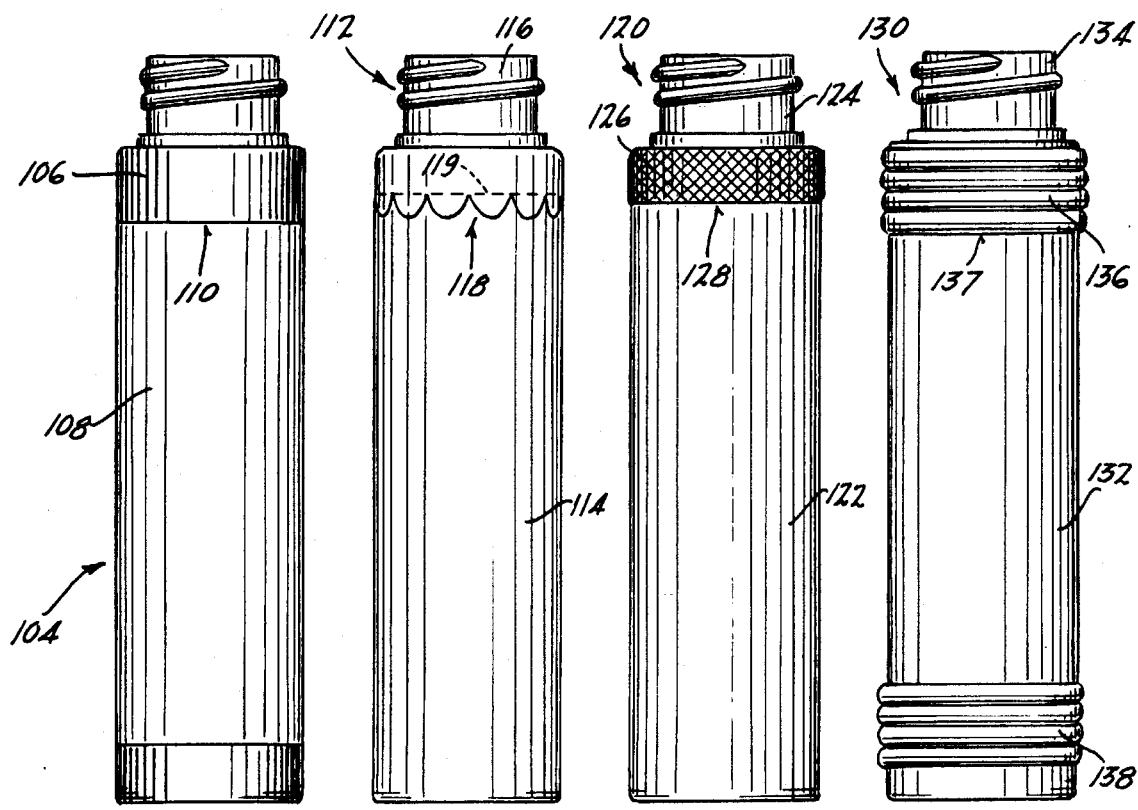
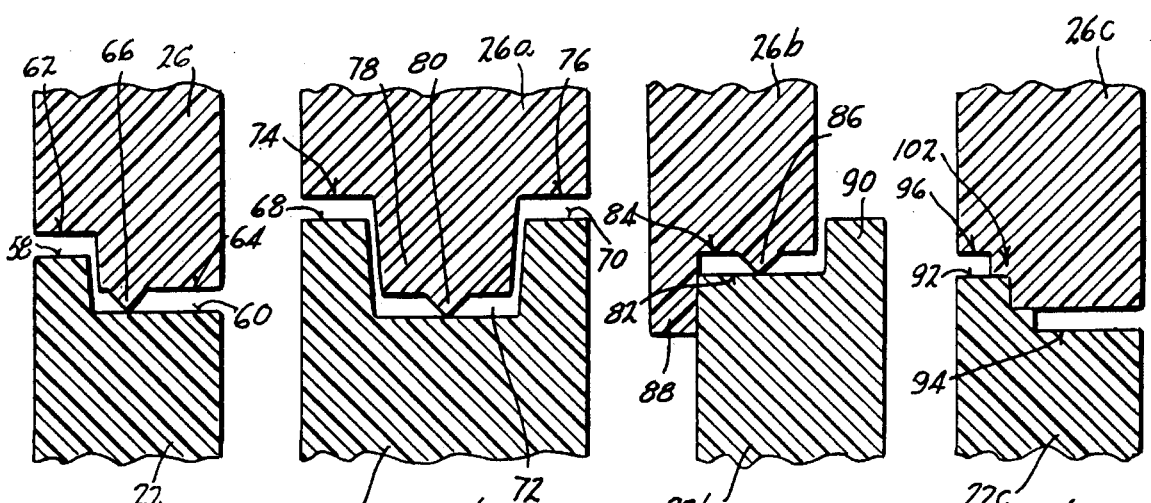

PLASTIC CONTAINER HAVING INJECTION-MOLDED CONTAINER COMPONENTS

NO CROSS REFERENCES TO RELATED APPLICATIONS STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

The invention relates generally to molded plastic containers of the kind currently used for a wide variety of products presently available in the consumer marketplace.

2. Description of the Related Art Including Information Disclosed Under 37 CFR §§1.97–1.99

In general, plastic containers can be produced by a number of different procedures, including what are commonly known as extrusion blow molding, injection blow molding, and stretch blow molding. The disadvantages of some of these techniques reside in potential difficulty in manufacture, and excessive cost. In particular, extrusion blow molding is slow and expensive compared with injection blow molding and stretch blow molding. There are limitations to the type of plastic adaptable to each process, and often there are secondary or supplemental processing steps that must be performed in order to achieve the desired results, namely a finished, workable, cost-effective and reliable container.

Components produced by the above methods often suffer from limited uniformity in wall thickness and relatively wide dimensional tolerance, owing to dependence upon blowing the form into a mold from an extrusion tube and not being able to confine the plastic as it is taking shape between a mold and a force.

Injection blow molding enjoys the advantage of greater precision compared to extrusion blow molding, but also suffers limitations with respect to the type of plastics available for use in such a process. In particular, injection blow molding employs horizontal core rods to hold and transfer plastic components through multiple stages of manufacture. The viscosity of the resins while the components are still in a plastic state has been found to be critical in obtaining acceptable results. Thus, the choice of plastic is limited, and processing can become complex. Additionally, control of the processing temperature is difficult, since internal cooling of core rods is awkward to predict and regulate. Essentially the process depends upon forming a parison or preform, by injection molding around a core rod which thereafter carries the still-plastic parison to a blow molding station, where it is formed into its final shape or configuration. Finally the article is transferred to an ejection station, where it is removed from the core rod. Although wall thickness in this case is more precise than with articles produced by extrusion blow molding, a deflected core rod can result in undesirable wall thickness variations. A significant problem with injection blow molding is that of cost, since the initial installation is far more expensive than for extrusion blow molding. Molds for injection blow molding typically cost between 4 and 5 times that involved with equipment for extrusion blow molding.

Stretch blow molding requires an even greater investment in tools and machinery, and also is limited in its application to fewer polymers than is the case with extrusion blow molding, since the transfer of a parison to a blow mold station requires some viscosity considerations, even though the cores are in a vertical rather than in a horizontal position.

The following patents are cited as being of interest:

| U.S. Pat. Nos.: | | |
|---|---|---|
| 3,244,312 | 3,885,701 | 3,887,316 |
| 3,938,687 | 4,251,001 | 4,356,926 |
| 4,372,459 | 4,572,851 | 4,610,394 |
| 4,931,329 | | |

U.S. Pat. No. 4,572,851 discloses a two-part bottle where the individual parts are formed by stretch-type molding and thereafter joined together along a circumferential line. One of the parts or sections is telescopically received in the other, by a friction-fit, and the resultant joint formed as a "leak-proof friction weld", col. 6, line 47. An example of a suitable plastic is given in col. 7, line 7, as polyethyleneterephalate [sic]. The outer surface of the seam presents an external bead, FIG. 10, at the location of the seam.

U.S. Pat. No. 4,372,459 discloses a container constituted of joined cup-like sections, (with optional thin plastic coatings), and where adhesive is applied at the joint. The adhesive functions both to hold the sections together, and to "cover" the free edges of the members (col. 1, line 51) in the sealed condition of the container.

U.S. Pat. No. 4,356,926 discloses a two-piece container with a plastic upper section and a metal lower section. Heat fusion is employed to join and seal the sections together.

U.S. Pat. No. 4,931,329 illustrates a proposed construction which allegedly facilitates the re-cycling of a bottle by cutting sections out of it and adapting the resulting pieces to other uses. The disclosed device has the appearance of the 2 liter soft drink bottles currently in use, at least some of which are made by joining molded bottle halves along an axial plane.

Of the remaining patents noted above, U.S. Pat. Nos. '394 and '001 disclose containers having axial seams. U.S. Pat. Nos. '312, '687, and '701 relate to containers having separable upper and lower sections, at a transaxial or cross plane. U.S. Pat. No. '701 shows a tongue and groove configuration between a container's lid and body.

U.S. Pat. No. '316 illustrates an injection-blow molding apparatus for producing containers.

SUMMARY OF THE INVENTION

The above disadvantages and drawbacks of prior blow-molded or stretch-molded containers are largely obviated by the present invention which has for an object the provision of a novel and improved container and method for its production, the container being simple in its structure, inexpensive to manufacture, and which provides a high-quality product that is dimensionally precise and which can be provided with any type of surface finish, and useable with an unusually wide variety of heat-softenable plastics.

Yet another object of the invention is to provide an improved container as outlined above, which can be especially economically produced with a minimum of equipment, and which relies largely on available injection molding techniques that are capable of fabricating molded components possessing the high quality and precise dimensional characteristics noted above.

Still another object of the invention is to provide an improved container in accordance with the foregoing, which is reliable in use over extended periods, and which is essentially devoid of the usual vertical seams that characterize most conventionally molded containers currently in use today.

Yet another object of the invention is to provide a novel method of manufacturing a container of the type noted above, which method is both economical to practice and which provides superior results from the standpoint of dimensional precision and stability, such results not being heretofore obtainable with conventional blow- or stretch-mold techniques often employed in the mass production of containers of this type.

The above objects are accomplished by an amorphous or partially amorphous plastic container constituted of injection-molded plastic which has the property of enabling discrete particles thereof to be securely joined to each other under the action of heat and pressure. In a preferred embodiment, adjoining portions of two container components which have been previously injection-molded are joined at mating edges so as to constitute a common continuous joint in the container. The edges initially have configurations enabling them to be mutually abutted. The edges after being so abutted have been subjected to heat and pressure of a magnitude sufficient to cause them to meet and merge into each other to form the continuous joint in the container.

The objects are further accomplished by a method of fabricating a plastic container constituted of injection-moldable materials which have the property of enabling discrete pieces thereof to be securely joined to each other under the action of heat and pressure, the method including the steps of injection-molding from the materials, two adjoining portions of the container, the portions having mateable edges which are molded with a configuration enabling them to be mutually abutted and to form a seam which will be located in the container walls. Thereafter the mating edges are positioned in mating relationship with each other, and subjected to heat and pressure which is sufficient to securely join them against casual separation.

The advantage of the present invention is that simple injection molding techniques can be employed to produce as few as two mating components, each having an unusually high degree of dimensional stability, and each being characterized by close tolerances, to thus facilitate joining the two components along mateable edges thereof, all without encountering the usual problems of poor fit, drift or warping, out-of-roundness, etc. Thus, potential problems involving dimensional compatibility, as are often encountered in mass produced containers, are largely eliminated by the present discovery.

Another advantage of the present invention is that due to the fact that the initial components are injection molded, an unusually wide variety of amorphous plastic composition can be employed, thereby rendering the process of the invention adaptable to many different applications. In particular, there is currently a move in this country toward the use of plastics which are re-cycleable; the practice of the present invention in conjunction with certain "environmentally friendly" plastics is thus in harmony with such environmental considerations.

Other features and advantages will hereinafter appear.

BRIEF DESCRIPTION OF THE DRAWINGS

In the drawings:

FIG. 1 is an axial section of a conventional container produced by blow molding, and of a type having two mating sections joined along an axial seam. The container suffers from relatively poor dimensional control and generally non-uniform wall thicknesses.

FIG. 2 is a view, partly in front elevation, and partly in axial section, of a container constructed in accordance with the present invention, wherein two injection molded components have been joined along a transaxial plane, to form a composite container characterized by substantially uniform wall thicknesses and high dimensional stability.

FIG. 3 is a view like FIG. 2, of a modified container, constituting another embodiment of the invention.

FIG. 4 is a view of one step in the method of production of the container of FIG. 2, wherein an ultrasonic horn is applied to the upper one of two assembled injection-molded container components, to ultrasonically weld the components at a circumferential seam or joint that lies in a transaxial plane.

FIG. 5 is a view like FIG. 4, except where the horn is applied to the lower component of the composite container of FIG. 3.

FIG. 6 is a fragmentary section of one type of container wall seam, constituting a step joint, as employed with the container of either FIG. 2 or that of FIG. 3.

FIG. 7 is a view like FIG. 6, of a modified seam, constituting a tongue-and-groove or rabbetted joint.

FIG. 8 is a view like FIGS. 6 and 7, except showing a further modified seam, constituting a hidden, step joint.

FIG. 9 is a view like FIGS. 6–8, except showing a still further modified seam, constituting a shear joint.

FIG. 10 is a side elevation of a container produced in accordance with the present invention, and incorporating an opaque upper body component, for purposes of decoration and also to conceal the transaxial seam between the upper and lower container components.

FIG. 11 is a view like FIG. 10, except showing a modified upper body component having a scalloped surface ornamentation, for camouflaging the transaxial container seam.

FIG. 12 is a view like FIGS. 10 and 11, except showing a further modified upper body component, having a knurled surface configuration.

FIG. 13 is a view like FIGS. 10–12, except showing upper and lower body components having ribbed configurations, the upper ribbed configuration concealing the joint or seam between the two components.

DESCRIPTION OF THE PREFERRED EMBODIMENTS

Figure 14:
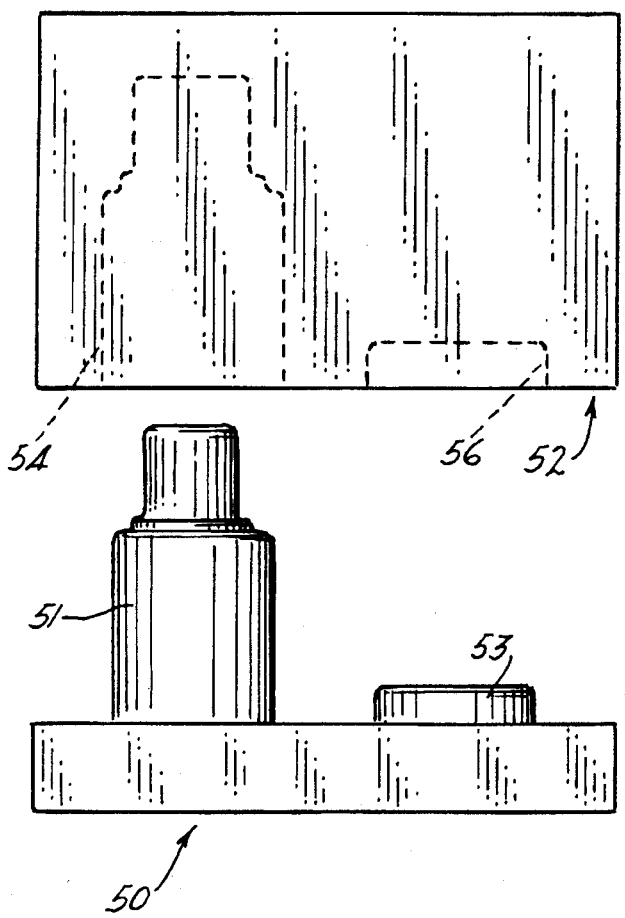
FIG. 14 is a diagrammatic view showing cooperable dies in a family mold for simultaneously producing an injection molded upper component and an injection molded lower component of a container.

Referring first to FIG. 1, there is illustrated a conventionally-molded container 17 having a body 18 and integrally formed bottom wall 19, and having a shouldered neck portion with the usual external thread or "finish". Typically, for a small container of the hand-held variety, a nominal 0.030" wall thickness can be provided. In the illustrated container, which has been formed by known blow-molding techniques, the actual thickness at location "A" is shown as having deviated from the nominal 0.030" figure, to a slightly larger dimension, for example 0.034" and the thickness at location "B" has similarly deviated, for example, to 0.032"; similarly, at the bottom wall, the resultant dimension "D", for example, often is as much as 0.210" because of excess material on the parison which characterizes this type of plastic molding process.

In many applications, dimensional intolerances such as that noted above are acceptable. Where the product being dispensed is in the form of capsules, granules, or even liquids, usually there is specified either a "net weight", "net volume", or a number count, to indicate the actual amount of the product contained.

Polyethylene containers manufactured by conventional blow molding techniques are generally not considered especially aesthetic; the outlines or profiles are rough as are the surface textures or finishes obtainable. Instead, these surfaces tend to be grainy or "matte" type finishes. Polished or gloss finishes are normally not obtainable, owing to the need for venting gases trapped between the outer surface and the mold.

Also, where container sections are joined along a longitudinal or axial seam, the dimensional variations between the mating parts almost always creates discontinuities or mismatching at the joints or seams. While the joints may be functionally adequate, the mismatch is somewhat unsightly, and gives rise to a "mass produced" appearance which may detract from the otherwise desirable overall impression often sought by the manufacturer of the product, namely one of quality, class, and/or style.

Referring now to FIG. 2 and in accordance with the present invention there is provided a novel plastic, seamed container 20 which provides superior characteristics from the standpoint of precision in wall thickness, dimensional stability, and uniformity and quality of finish, of a degree heretofore unobtainable in conventional containers manufactured by the usual extrusion molding processes or other blow molding techniques.

The novel container of the present invention shown in FIG. 2 comprises a body or lower component 22 with integral bottom wall or heel 24, and an upper component or neck 26, each of the two components 22 and 26 being constituted as a separate injection-molded part, and the resultant injection-molded parts assembled to one another by means of heat and pressure along their mating edges or abuttable surfaces 28 and 30 to form an essentially continuous circular joint 32. The abuttable surfaces or mating edges of the upper component are designated 30, and those of the lower component designated 28. In FIG. 2, the two adjoining cylindrical portions of the container constitute aligned extensions of each other, and form the jointed cylindrical container side wall, which side wall has substantially uniform thickness both at the joint and beyond the joint. The mating edges are mutually abutted without jutting out one from the other. The resultant joint is thus characterized by smooth, flush exterior adjoining surfaces constituting essentially stepless continuations of one another, as shown in FIGS. 2–4.

Further, in accordance with the invention, heat fusing of the mating abuttable surfaces of the injection molded components is accomplished by either spin welding, ultrasonic welding or equivalent means. FIG. 4 shows in dotted outline, a titanium horn 34 which is used in accomplishing the heat-sealing and joining of the abuttable surfaces of the upper component 26 and the lower component 22 of the container 20. The horn 34 per se is known, and functions by producing ultrasonic mechanical waves (typically at 20 kHz minimum), and applying them to the upper component 26 with the latter and the lower component 22 held together and positioned in axial alignment with one another.

The joint 32 is fused at a transaxial plane indicated by the letter "E" in FIG. 4.

In FIG. 5, a horn 36 is applied to the lower component 38 of a multi-part injection molded container 40, forming a joint 42 between the upper and lower components 44 and 38 at the location indicated by the letter "F" in this figure. FIG. 5 corresponds to the formation of the container of FIG. 3, where the continuous joint 42 is adjacent the bottom wall 48 thereof.

FIG. 14 illustrates diagrammatically, a core and cavity 50, 52 for performing the initial formation of the two container components, by injection molding. Cavities 54, 56 are shown in dotted outline in FIG. 14.

Figure 15:
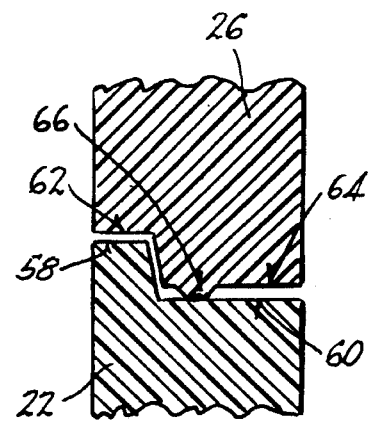
FIG. 15 is a view similar to FIG. 6, except with the upper and lower components positioned at an intermediary stage during the application of heat to the joint, wherein a bead on the edge of the upper component begins to soften and deform.
Figure 16:
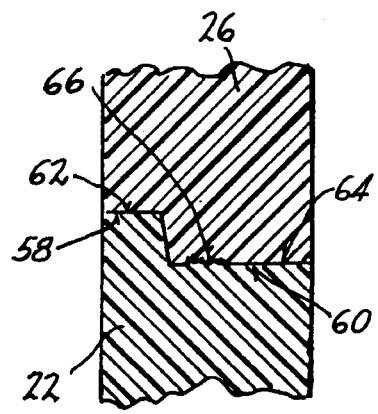
FIG. 16 is a view like FIG. 15, but after the bead has flattened essentially completely, and merged or intermingled with the material of the facing edge of the lower container component, and where the edges of the components have become essentially flush with one another. The outer surfaces of the components are also flush, as shown, creating a clean, finished appearance which largely camouflages the seam between the components.

The components of the containers 20, 40 can be formed with various edge configurations. Such configurations usually encompass abuttable surfaces as shown in FIGS. 6–9. In particular, in FIG. 6, the lower component 22 has abuttable surfaces 58, 60, and the fit is seen to be telescoping, or characterized by an interfitting or step joint. The upper component 26 has abuttable surfaces 62, 64. Disposed on at least one abuttable surface 64 is an annular bead 66 which functions as an annular energy director and which is deformable and is adapted to seal against the facing surface 60 of the cooperable component 22. During heat fusion of the edges, as diagrammatically shown progressively in FIGS. 15 and 16, the energy director 66 softens and deforms (mushrooms) or flattens, and the abuttable surfaces 58, 60, 62, 64 finally arrive at the relative positions shown in the latter figure. By this operation, the outer cylindrical surfaces of the upper and lower components 26, 22, respectively are seen to be substantially flush with one another, thus leaving only a very slight external "crack" in the exterior surface of the resultant container. Stated differently, the outer surface of each component 26, 22 constitutes essentially a perfectly aligned continuation of the other. In arriving at the present invention, applicant has discovered that the precision with which the upper and lower components 26, 22 respectively can be formed through the use of injection molded parts, as opposed to blow- or stretch-molded parts, enables him to control the dimensions of the parts with the required degree of accuracy so as to arrive at the clean, flush surface configuration noted above.

In the embodiment of FIG. 6, it can be seen that the upper component 26, containing the bead or energy director 66, is intended to undergo melting and intermingling or flowing together of the particles of the plastic to a greater extent than that of the other component 22, and that some parts of the joint are melted (adjacent the original location of the energy director 66) whereas other parts (adjacent the lead lines for the numerals 58, 60, 62 and 64), radially spaced from the energy director both inwardly and outwardly, merely either abut without undergoing much melting, or alternately do not melt to any significant degree, depending on the draft of the angles in the injection molds of FIG. 14.

The overlapping configuration of the outermost flange in FIG. 6, assists in achieving precise alignment of the outer surfaces of the upper and lower container components 26, 22, respectively.

Another embodiment of the invention is shown in FIG. 7, where the respective abuttable surfaces 74, 76 and 68, 70 of the upper and lower components 26a, 22a, respectively are provided with a cooperable tongue and groove formation 78, 72, constituting a rabbet joint. One surface is provided with an annular bead or energy director 80, adapted to melt upon application of the titanium horn, and seal against the cooperable surface of the facing component. The abuttable surfaces 76, 70 and 74, 68 lying radially inwardly and outwardly respectively of the energy director 80, as presently understood, either do not melt to any extent, or alternately melt to only a limited extent.

FIG. 8 illustrates yet another embodiment of the invention, showing a hidden step joint. The upper component 26b is provided with a depending flange 88 which overlies the edge of the lower component 22b. The upper and lower components 26b, 22b have abuttable surfaces 84, 82 respectively, and a bead or energy director 86 on the surface 84 of the upper component 26b is adapted to engage and melt against the surface of the lower component 22b. The latter optionally has an upwardly facing hidden flange 90, for telescoping alignment of the two components 26b, 22b. The provision of uniform wall thicknesses, coupled with a precise dimensioning of the depending flange 88 of the upper component 26b and hidden flange 90 of the lower component 22b, all of which are attainable only with injection molding, result in a snug fit between the components 26b, 22b. A snug fit such as this, as provided by the invention, cannot be obtained with conventional blow or stretch molding techniques, and is believed to be unique with the present invention.

As an alternative to heat fusion of the mating abuttable surfaces of the components, suitable adhesive may be applied, and thereafter the components placed in a fixture (not shown) until the adhesive cures.

Yet another embodiment of the invention is shown in FIG. 9, illustrating a modified connection in the form of a shear joint. The upper component 26c has an abuttable surface 96; the lower component 22c has abuttable surfaces 92, 94. Each component has a stepped shoulder 102 which cooperates with and is heat-fused to the shoulder of the facing component, as shown.

FIGS. 10–13 illustrate different forms of ornamentation for use with the injection-molded, heat-fused or welded components of the containers of the present invention. In FIG. 10, one of the components of the container 104, for example the upper component 106, is injection molded from an opaque substance, purposely defining a demarcation line 110 between the components 106, 108, which line 110 coincides with the transaxial joint and thus tends to conceal or camouflage the same. In the event that the joint is disposed adjacent the bottom of the container, the lower component can similarly be provided as an opaque molded piece, again for the purpose of concealing the joint.

FIG. 11 illustrates a container 112 having upper and lower components 116, 114 respectively, the upper component 116 having a scalloped surface configuration 118 which overlies the joint 119 between the upper and lower components 116, 114 in providing concealment of the transaxial joint therebetween.

FIGS. 12 and 13 similarly show alternate surface configurations, respectively. In FIG. 12, the container 120 having upper and lower components 124, 122 respectively, is provided with a knurled surface 126. The joint 128 between the upper and lower components is thus concealed thereby. In FIG. 13, the container 130 constituted of upper and lower components 134, 132 respectively, has an externally ribbed surface 136, with the joint or line of demarcation 137 between the upper and lower components 134, 132 being concealed by the ribbed surface 136. Optionally, a second ribbed surface 138 can be incorporated in the lower component 132, as shown.

In all of the constructions of FIGS. 10–13, the decorative surfaces are preferably incorporated in the respective injection mold cavity, and the resultant shape thereby imparted to the particular container component at the time that it is initially injection molded. No additional molds are required; nor are there required additional steps involving adding the decorative structure to the respective component. The decorative surfaces or portions thus constitute means for camouflaging the seam or joint between the upper and lower components, the word "camouflaging" being intended to mean either completely conceal, or otherwise render less noticeable or prominent.

Where the joint is disposed just below the shoulder of the container, more often than not, most of the container can be injection molded without splitting an injection mold cavity. Under this circumstance, there will exist no side seams on the finished article, which is an important consideration from the aesthetic standpoint.

Also it is to be noted that unless spin-welding is employed to join the components of the container, the cross-sectional configuration of a container produced in accordance with the invention, need not be strictly round. The principles of the invention are applicable to virtually any polygonal configuration, including but not limited to square, rectangular, triangular, daisy- or star-shaped, etc.

Owing to the growing necessity to eliminate from packaging, those plastics which are considered environmentally non-recycleable (such as those which contain halogens), and those that are classified as toxic as a result of residual monomers, the need for employing certain "environmentally friendly" polymers is becoming an important factor in the field of closures. In keeping with the conscious effort to minimize accumulation of solid waste, the principles of the present invention can be applied using a wide variety of polymers that can be injection molded and heat welded as indicated above.

In carrying out the invention, the list of plastics that are susceptible to injection molding and subsequent heat fusing includes but is not limited to: Generally, amorphous and semi-crystalline rigid thermoplastic families including: ABS, ABS' polycarbonate alloy (Cycoloy 800), Acrylics, Acrylic multipolymers, Baudiene-styrene, Phenylene-oxide based resins (Noryl), Polyamide-imide (Torlon), Polyarylate, Polycarbonate, Polyetherimide, Polyethersulfone, Polystyrene (general purpose), Polystyrene (rubber modified), Polysulfone, PVC (rigid), SAN-NAS-ASA, Xenoy (PBT/polycarbonate alloy), Acetals, Cellulosics (CA, CAB, CAP), Fluoropolymers, Ionomers, Liquid Crystal Polymers, Nylon, Polybutylene terephthalate-PBT, Polyethylene terephthalate-PET, Polyetheretherketone-PEEK, Polyethylene, Polymethylpentene, Polyphenylene sulfide, and Polypropylene.

Those formulations appearing in the preceding list are not all necessarily re-cycleable, with the present technology, however.

The present invention also embraces the following steps for manufacture of a container. In particular, with reference to FIGS. 2, 4, 6, 14, 15 and 16, the method comprises fabricating a plastic container 20 constituted of injection-moldable materials which have the property of enabling discrete pieces or components thereof to be securely joined to each other under the action of heat and pressure, including the steps of injection-molding from the materials (in dies 50, 52), two adjoining portions of the container, for example the upper and lower components 26, 22 respectively, and where the portions have mateable edges which are molded with a configuration enabling them to be mutually abutted and to form a seam 32 which will be located in the container walls. Thereafter the method comprises the step of placing the mating edges 30, 28 in mating relationship with each other, and subjecting the thus-mated edges to heat and pressure by the ultrasonic horn 34, sufficient to securely join them against casual separation.

The mating edges can, in one embodiment as for example FIG. 6, comprise abuttable surfaces 62, 64 and 58, 60, or FIG. 7, rib and rabbet formations 78, 72. Typically, the molded edges have stepped configurations, and preferably one of the edges has a bead or energy director which quickly yields to the action of heat and pressure. The heat and pressure are produced by either spin-welding, sonic welding, or other suitable heat application. As an alternative, adhesive may be employed to loin the injection molded components together.

From the above it can be seen that I have provided a novel and improved plastic, seamed container which provides significantly improved physical characteristics, coupled with the capability of application to literally hundreds of different chemical plastic formulations. The only material-related requirements for carrying out the invention are: 1) that the plastic substance be capable of being formed into a given shape by injection molding; and 2) that the resultant injection molded component be capable of being heat fused to an extent necessary to enable the molecules or particulate pieces thereof to merge into those of a component of the same (or different) plastic, under the application of suitable heat and pressure.

The improved container characteristics realizeable from the standpoint of precision in wall thickness, dimensional stability, and uniformity and quality of finish, have heretofore been unobtainable in conventional containers manufactured by the usual extrusion molding processes or other blow molding techniques.

The disclosed containers and method for their manufacture are thus seen to constitute a significant advance and improvement in the field of molded plastic containers.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A plastic container constituted of two, separately injection-molded plastic parts having two adjoining cylindrical portions attached to each other at a joint, the plastic substances of each of said parts having the property of enabling discrete particles thereof to be securely joined together under the application of heat and pressure, said two adjoining cylindrical portions of said container at said joint constituting aligned extensions of each other and further constituting a two-part, jointed cylindrical container side wall of substantially uniform thickness both at said joint and beyond said joint, said container parts having been previously separately injection-molded so as to form a pair of continuous mating edges which form said joint, said mating edges initially having configurations enabling them to be mutually abutted without jutting out one from the other and said edges after being so abutted having been subjected to heat and pressure of a magnitude sufficient to cause them to melt and merge into each other to form the said joint which constitutes the uniform thickness side wall of said container, said joint in the container having smooth, flush exterior adjoining cylindrical surfaces constituting essentially stepless continuations of one another.

2. A plastic container as set forth in claim 1, wherein:
   a) the said two adjoining cylindrical portions of the container are transaxially disposed.

3. A plastic container as set forth in claim 1, wherein:
   a) the said joint in the container is circular.

4. A plastic container as set forth in claim 3, wherein:
   a) the said joint is a spin-welded joint.

5. A plastic container as set forth in claim 1, wherein:
   a) the said mating edges initially have interfitting portions.

6. A plastic container as set forth in claim 1, wherein:
   a) the said cylindrical portions comprise heat fused portions, which have been joined together by melting,
   b) one of said heat fused portions having been melted to a greater extent than the other.

7. A plastic container as set forth in claim 6, wherein:
   a) one of said heat fused portions is nested in the other heat fused portion.

8. A plastic container as set forth in claim 1, wherein:
   a) said adjoining portions of the joint are in overlapping relation.

9. A plastic container as set forth in claim 1, wherein:
   a) said adjoining portions of the joint are in overlapping relation,
   b) one of said adjoining portions having been melted to a greater extent than the other.

10. A plastic container as set forth in claim 1, wherein:
    a) parts of said joint abut each other without being melted into each other.

11. A plastic container as set forth in claim 6, wherein:
    a) said joint has parts which overlap each other on opposite sides of said heat fused portions.

12. A plastic container as set forth in claim 1, wherein:
    a) the said joint comprises a sonic-welded joint.

13. A plastic container as set forth in claim 1, wherein one of the plastic parts of the container is molded of an opaque .substance, such that there is formed a demarcation line at said edges, the demarcation line coinciding with the joint and tending to conceal and camouflage said joint.

14. A plastic container as set forth in claim 1, wherein one of the plastic parts has an exterior ornamental surface configuration which overlies the said joint and tends to conceal and camouflage it.

15. A plastic container as set forth in claim 1, wherein one of the plastic parts has a knurled exterior surface terminating at the joint, tending to conceal and camouflage it.

16. A plastic container as set forth in claim 1, wherein one of the plastic parts has an exterior ribbed surface at the location of the joint, tending to conceal and camouflage it.

* * * * *